United States Patent [19]
Zimmerman et al.

[11] Patent Number: 5,662,545
[45] Date of Patent: Sep. 2, 1997

[54] PLANETARY GEAR DRIVE ASSEMBLY

[75] Inventors: James W. Zimmerman, Walnut; John L. Staylor; Jeff R. McKenzie, both of Riverside, all of Calif.

[73] Assignee: The Toro Company, Minneapolis, Minn.

[21] Appl. No.: 605,710

[22] Filed: Feb. 22, 1996

[51] Int. Cl.$^6$ .............................. F16H 1/46; F16H 57/12
[52] U.S. Cl. .......................... 475/344; 475/331; 74/409; 29/893.1
[58] Field of Search .................. 74/392, 409; 475/331, 475/344; 29/893.1, 464

[56] References Cited

U.S. PATENT DOCUMENTS

| | | | |
|---|---|---|---|
| 3,902,237 | 9/1975 | Benjamin | 29/893.1 X |
| 4,662,053 | 5/1987 | Aceti et al. | 29/893.1 X |
| 5,323,530 | 6/1994 | Goto et al. | 29/893.1 X |
| 5,400,506 | 3/1995 | Ichiki et al. | 29/893.1 |
| 5,429,558 | 7/1995 | Lagarde | 475/344 |

*Primary Examiner*—Charles A. Marmor
*Assistant Examiner*—Nathan O. Jensen
*Attorney, Agent, or Firm*—James W. Miller

[57] ABSTRACT

A planetary gear drive assembly for a rotary sprinkler includes a drive housing in which a planetary gear train is enclosed. A turbine located beneath one end of the drive housing rotates the gear train through a turbine shaft that extends into the drive housing. An output shaft extends out of the other end of the drive housing for rotating the nozzle assembly of the rotary sprinkler. The drive assembly includes an alignment means for causing the planetary gears in each stage of the gear train to self align the planetary gears relative to an internal ring gear on the drive housing as each stage is slid into the drive housing during assembly. The alignment means comprises a stepped extension on a forward edge of the ring gear that extends around only a portion of the circumference of the ring gear.

14 Claims, 4 Drawing Sheets

5,662,545

PLANETARY GEAR DRIVE ASSEMBLY

TECHNICAL FIELD

This invention relates to a planetary gear drive assembly for rotating a rotary sprinkler or the like. More particularly, this invention relates to an improved drive assembly having means for facilitating the assembly of the drive assembly and to a method of assembling the drive assembly.

BACKGROUND OF THE INVENTION

Rotary sprinklers are well known having a gear drive assembly powered by the force of the water passing through the sprinkler. The drive assembly typically includes a drive housing which encloses a planetary gear train. A water driven turbine located adjacent one end of the drive housing drives a turbine shaft that rotates the gear train within the drive housing. An output shaft at the other end of the drive housing is driven by the gear train and is attached to the nozzle assembly for rotating the nozzle assembly at a speed slower than the speed of rotation of the turbine.

In a drive assembly of this type, a plurality of planetary gear stages are used. The total speed reduction provided by the drive assembly depends upon the number of planetary stages that are used and the amount of speed reduction provided by each stage. It is common for each stage to include a plurality of planetary gears that engage an internal ring gear on the inner diameter of the drive housing. For the drive assembly to work properly, the planetary gears have to be properly aligned prior to the insertion of each stage into the drive housing so as to properly engage the teeth of the internal ring gear. If they do not, the gears will bind or otherwise malfunction and the drive assembly will not operate properly.

In one known manufacturing method for this type of drive assembly, the planetary gear stages are assembled onto the spindle of an assembly fixture until all of the planetary gear stages are stacked on top of one another. Then, an assembler inserts this stacked subassembly by hand into the drive housing. During this process, the assembler has to carefully observe the planetary gears in each planetary gear stage as each stage drops down into the housing to make sure that the planetary gears properly engage the grooves in the ring gear. If they are not so positioned, the assembler has to slightly rotate one or the other of the planetary gears using his or her finger to attempt to ensure the necessary alignment.

The need for visual observation of each planetary gear stage as it is assembled in the drive housing, and the need to often manually rotate or jiggle the planetary gears so that they engage the ring gear without binding, makes it difficult to assemble such drive assemblies. It requires a skilled assembler who is paying careful attention to the assembly process. Even so and considering the small size of the gears involved in this type of drive assembly, it is not unusual for at least some of the drive assemblies to be misassembled and rendered useless. The manufacturing technique just described has a scrap rate on the order of 4% or so even when the drive assemblies are being assembled by skilled and attentive assemblers.

SUMMARY OF THE INVENTION

This invention relates to a planetary gear drive assembly that solves the assembly problem of having to attempt to manually align the planetary gears in each gear stage with the internal ring gear on the drive housing.

One aspect of this invention comprises a planetary gear drive assembly which includes a drive housing having an internal ring gear on an inner diameter of the drive housing. A planetary gear train is located within the drive housing. The planetary gear train includes at least one planetary gear stage comprising: a central sun gear and a plurality of planetary gears spaced around and in engagement with an outer diameter of the sun gear such that rotation of the sun gear rotates the planetary gears. Each planetary gear is further in engagement with the internal ring gear on the drive housing. Finally, a means is provided for causing the planetary gears in the at least one planetary gear stage to self align with the internal ring gear in an automatic fashion and without manual intervention responsive to the movement of the at least one planetary gear stage towards the ring gear during assembly of the at least one planetary gear stage within the drive housing.

BRIEF DESCRIPTION OF THE DRAWINGS

This invention will be described more completely hereafter in the Detailed Description, when taken in conjunction with the following drawings, in which like reference numerals refer to like elements throughout.

DETAILED DESCRIPTION

Figure 1:
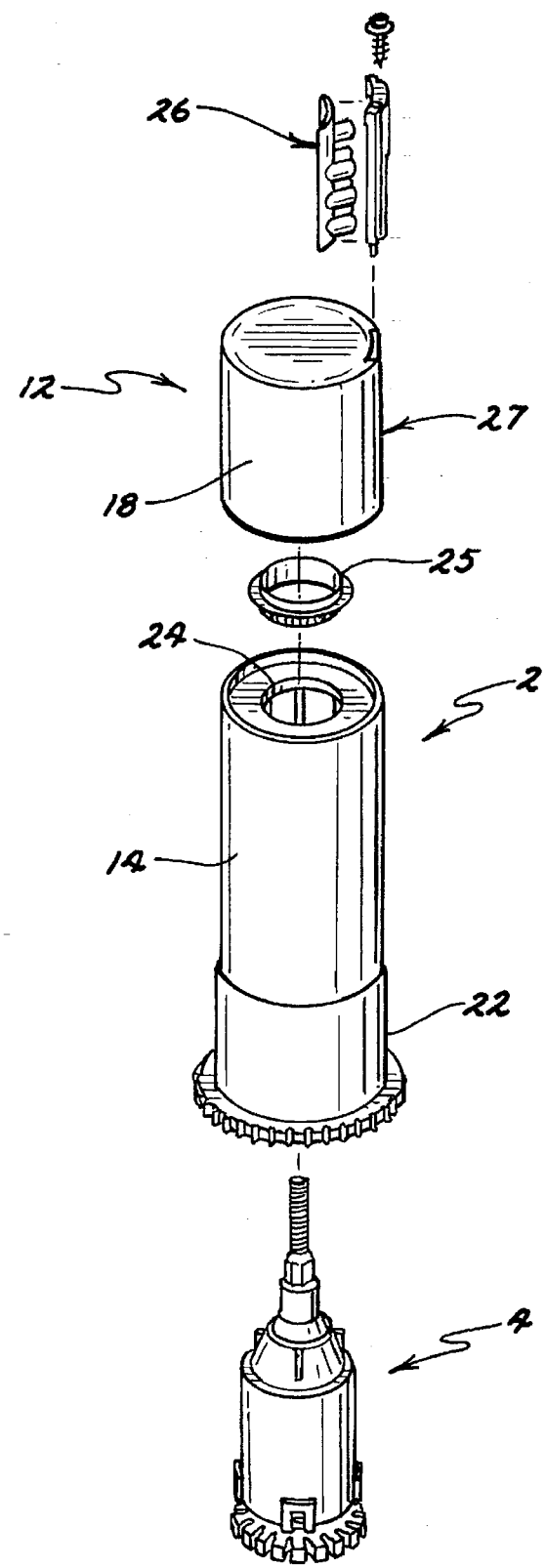
FIG. 1 is a perspective view of the relevant portion of a rotary sprinkler having the improved drive assembly of this invention, the parts being shown in an exploded form for the sake of clarity.

Referring first to FIG. 1, this invention relates to an improved drive assembly 4 for a rotary sprinkler illustrated generally as 2. Preferably, drive assembly 4 is powered solely by the force of the water flowing through sprinkler 2 so that no external source of power is required. Drive assembly 4 is preferably one which employs a planetary gear train 6 to rotate output shaft 8 of drive assembly 4 at a slower speed than turbine shaft 10. Thus, drive assembly 4 is able to rotate a nozzle assembly 12 about a rotational axis defined by the axis of output shaft 8 at a relatively slow speed suited to allow nozzle assembly 12 to deliver water to an area of ground that is traversed by nozzle assembly 12.

Referring further to FIG. 1, sprinkler 2 includes a sprinkler housing 14 that forms a water flow passageway in which drive assembly 4 is concentrically positioned. A rotary nozzle assembly 12 of any conventional design is non-rotatably attached in any convenient manner to output shaft 8 of drive assembly 4. For example, output shaft 8 of drive assembly 4 has a hex shaped portion 16 that is non-rotatably received in a hex-shaped bore or passageway (not shown) provided in the lower end of nozzle body 18. The upper end of output shaft 8 is threaded as shown at 20 to receive a coupling nut (not shown) that can be tightened within nozzle body 18 to attach nozzle body 18 to output shaft 8. Thus, when drive assembly 4 is in operation, rotation of output shaft 8 rotates nozzle assembly 12 relative to the stationary sprinkler housing 14.

Sprinkler housing 14 includes an inlet end 22 through which pressurized water will flow. This water will travel through sprinkler housing 14 around the exterior of drive assembly 4 through suitable gaps or passages that remain between drive assembly 4 and the inner diameter of sprinkler housing 14. Drive assembly 4 is intentionally sized to have a diameter that is less than that of the inner diameter of sprinkler housing 14 to allow water to flow around drive assembly 4 with drive assembly 4 being normally non-rotatably held in sprinkler housing 14 by spider-like ribs that protrude inwardly from sprinkler housing 14 to engage against the exterior of drive assembly 4. The water will then exit through an outlet 24 in sprinkler housing 14 to flow up into nozzle body 18 with a seal 25 being located at the interface between nozzle body 18 and sprinkler housing 14 to prevent water leakage from the base of nozzle body 18.

The water entering nozzle body 18 is sprayed from nozzle body 18 through at least one discharge nozzle, indicated generally at 26, set in a recess 27 therefor provided in the peripheral sidewall of nozzle body 18. The adjustable sprinkler nozzle shown in the assignee's copending patent application, Ser. No. 08/173,174, is one such nozzle that could be used in nozzle body 18, which application is hereby incorporated by reference. However, the type of nozzle 26 used in nozzle body 18 is not important to this invention and can comprise any conventional sprinkler nozzle used for spraying a stream of water.

Sprinkler housing 14 as illustrated herein forms only a portion of a complete sprinkler, namely sprinkler housing 14 comprises the pop-up riser portion of a pop-up sprinkler. Thus, sprinkler housing 14 would normally be contained inside an outer sprinkler body (not shown). A spring (also not shown) retracts sprinkler housing 14 into the outer body when water is not flowing through sprinkler 2. However, when water is admitted to the outer body of sprinkler 2, this water pushes up on sprinkler housing 14 against the bias of the spring to cause sprinkler housing 14 to pop up out of the outer body until nozzle assembly 12 is located above the ground. Operation of drive assembly 4 under the force of the water flowing through sprinkler housing 14 will then rotate nozzle assembly 12 about a generally vertical rotational axis defined by the vertical orientation of output shaft 8. When water is shut off to sprinkler 2, the spring force will cause sprinkler housing 14 to retract back down into the outer body.

While drive assembly 4 is shown in a sprinkler housing 14 that comprises the pop-up riser portion of a pop-up sprinkler, drive assembly 4 is suited for use in non pop-up sprinklers as well. In this event, sprinkler housing 14 would simply form a stationary tube or standpipe that has its upper end, and hence nozzle assembly 12, located permanently above the ground. In this type of sprinkler 2, the inlet end 22 of sprinkler housing 14 would be formed to be connected directly to a pipe fitting for receiving water from an irrigation supply pipe. Thus, drive assembly 4 of this invention is useful in rotary sprinklers generally, regardless of their type, regardless of the specific shape, number or type of discharge nozzles 26 used in nozzle body 18, regardless of how nozzle body 18 is attached to output shaft 8 of drive assembly 4, etc. The improved drive assembly 4 of this invention is simply one which is fitted inside a water flow passageway and which is powered by the force of the water flowing through the water flow passageway to rotate a rotary sprinkler nozzle.

Figure 2:
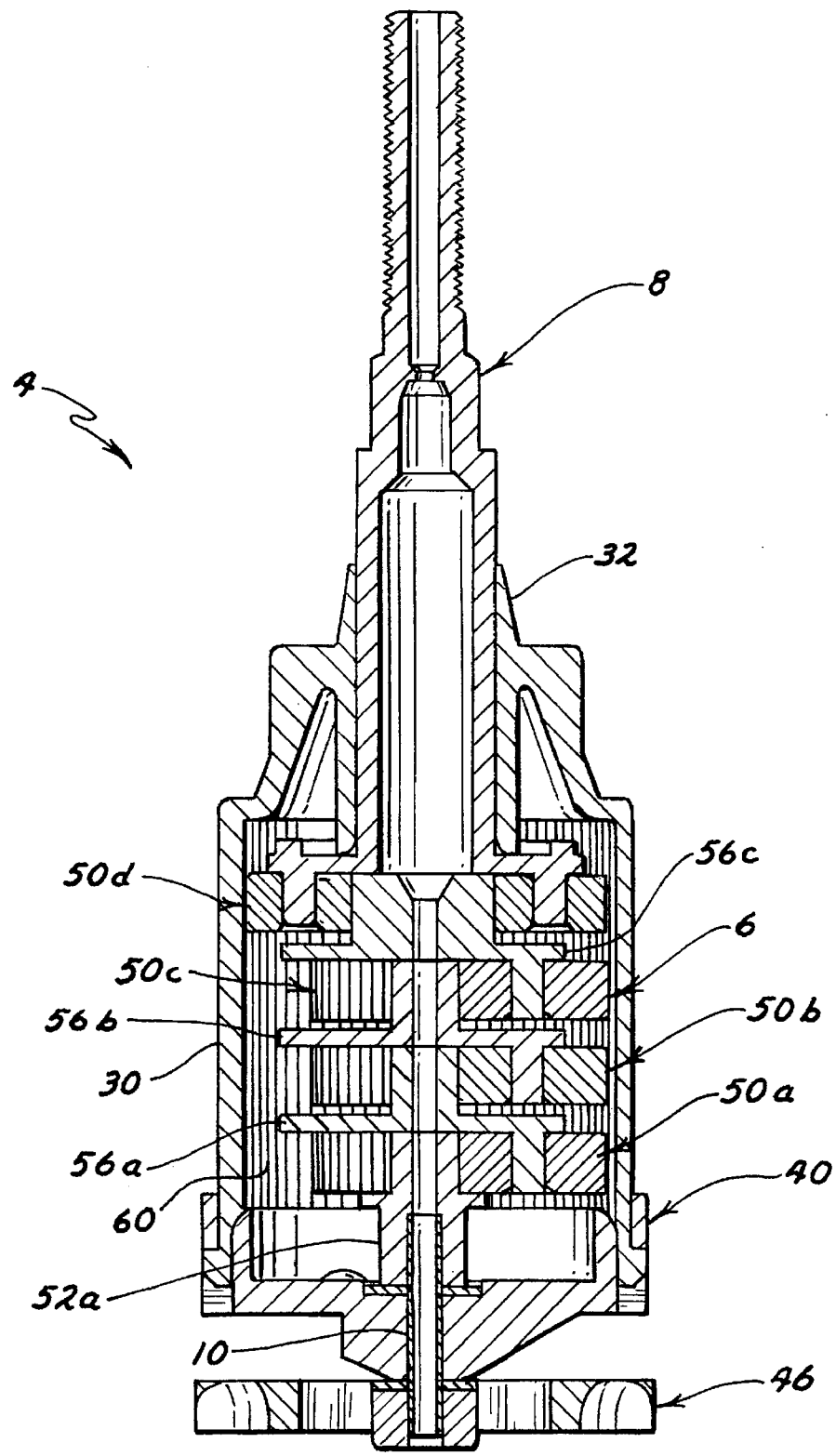
FIG. 2 is a cross-sectional view of the improved drive assembly of this invention.
Figure 3:
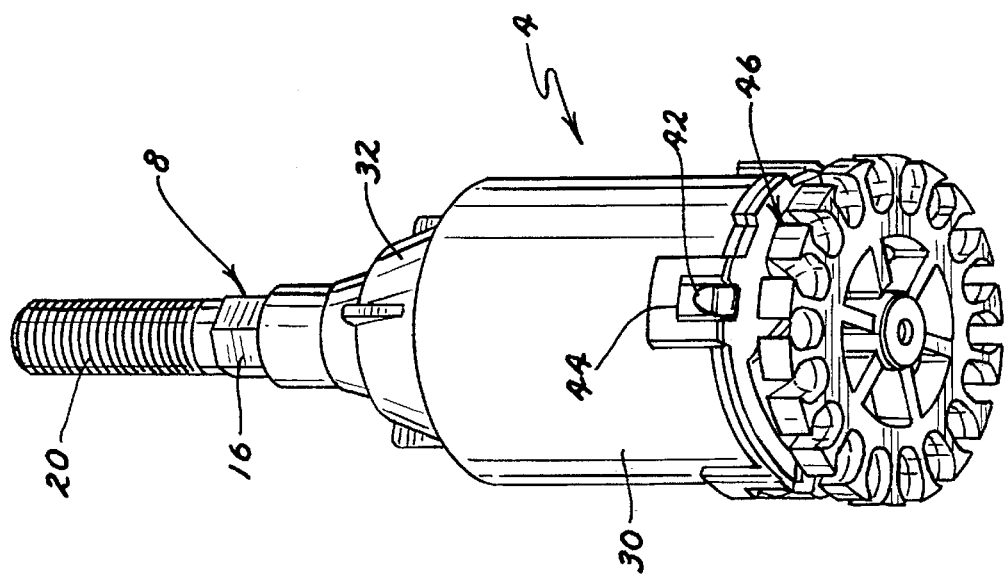
FIG. 3 is a perspective view of the improved drive assembly shown in FIG. 2.
Figure 4:
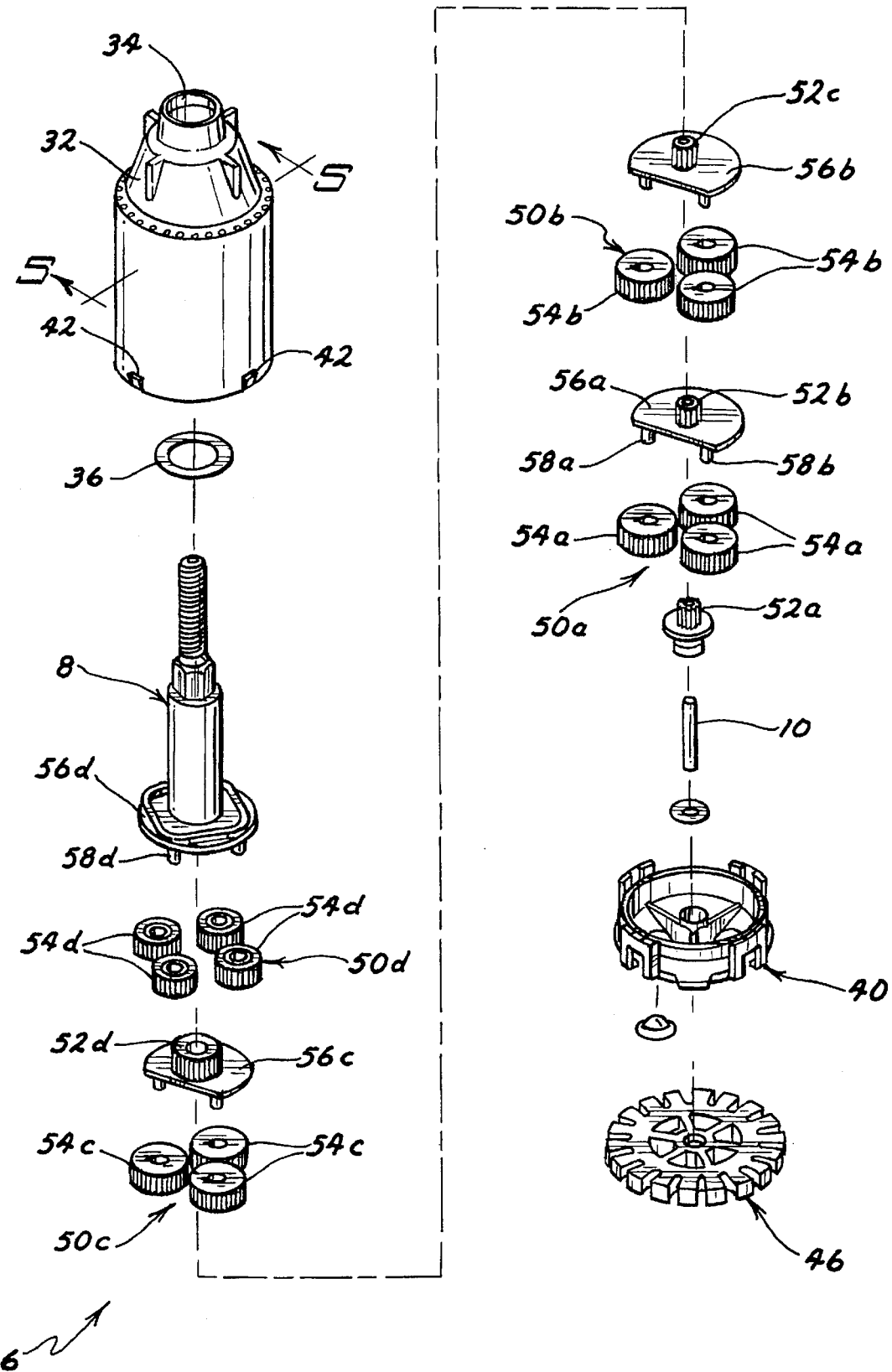
FIG. 4 is a perspective view of the drive assembly shown in FIG. 2, the parts being shown in an exploded form for the sake of clarity.

Referring now to FIGS. 2–4, drive assembly 4 includes a drive housing 30 that is generally enclosed. Drive housing 30 includes an upper, generally conically shaped end 32 having an opening 34 through which output shaft 8 of drive assembly 4 extends. A compression washer 36 can be compressed between a shoulder 38 on the output shaft and the inside of the upper end 32 of drive housing 30 to attempt to seal output shaft 8 against the passage of water around output shaft 8.

The lower end of drive housing 30 is open during assembly to allow planetary gear train 6 to be assembled inside drive housing 30. Once gear train 6 is assembled in drive housing 30, the lower end of drive housing 30 is closed by a generally cup-shaped end cap 40 that is affixed to drive housing 30 in any suitable manner. For example, the end cap/drive housing combination could be provided with interlocking tab 42 and slot 44 connectors that rigidly unite when end cap 40 is pressed onto the open end of drive housing 30. Alternatively, other means for affixing end cap 40 to drive housing 30, e.g. sonic welding, could be used.

A turbine 46 is located immediately beneath the lower end of drive housing 30, namely beneath end cap 40 after end cap 40 is affixed to the lower end of drive housing 30. Turbine shaft 10 extends upwardly through an opening or aperture located in end cap 40 with turbine shaft 10 carrying a small diameter input gear 52a that drives planetary gear train 6 in drive housing 30. Thus, as turbine 46 spins under the influence of water passing through sprinkler housing 14 and past drive assembly 4, the rotation of turbine 46 will rotate shaft 10 and hence planetary gear train 6 to eventually rotate output shaft 8 at a slower rate of speed than turbine 46. Because output shaft 8 is affixed to nozzle assembly 12, nozzle assembly 12 is then rotated relatively slowly as determined by the amount of the speed reduction provided by planetary gear train 6.

Planetary gear train 6 includes a plurality of planetary gear stages 50, namely four such stages 50a–50d, that are stacked on top of one another between input gear 52a and output shaft 8. Each stage 50 includes a central sun gear 52 and a plurality of planetary gears 54 that are circumferentially spaced around the outer diameter of sun gear 52 and engage with the outer diameter of sun gear 52. Planetary gears 54 in each particular stage 50 are identical to one another, having the same size and number of teeth, though gears 54 in different stages 50 may have different numbers of teeth or different sizes.

When sun gear 52 rotates in each stage, it rotates the planetary gears 54. In drive assembly 4 shown herein, there are four stages, 50a–50d which provide a speed reduction from one stage to the next. Thus, considering all of the stages 50a–50d of gear train 6, there is a substantial reduction in speed between the speed of rotation of input gear 52a and output shaft 8. As is well known by those skilled in the art with respect to planetary gear trains, the amount of speed reduction in each stage 50 is generally determined by the difference in the number of teeth on the sun gear 52 for that stage and the number of teeth in the internal ring gear 60, to be described hereafter.

A gear carrier 56 is provided in each stage 50 on which the planetary gears 54 of each stage are rotatably received around mounting pins 58, one mounting pin 58 being provided on carrier 56 for each gear 54. As the planetary gears 54 rotate around the center of sun gear 52, they rotate the corresponding gear carrier 56 at the same speed that the planetary gears orbit the sun gear 52. The gear carriers in the first three stages 50a–50c carry the sun gear 52 for the next stage on the other side of carrier 56 opposite to the planetary gears 54. Thus, the sun gear 52 for the next stage is rotated by the rotation of the gear carrier 56 of the preceding stage.

As is clear from FIG. 4, the sun gear 52 for the first stage 50a is formed by the small diameter input gear 52a affixed to turbine shaft 10. The gear carrier 56 of the last stage 50d does not carry a sun gear 52 on top thereof. Instead, the output shaft 8 is integrally affixed to gear carrier 56 in last stage 50d.

Drive housing 30 includes an internal ring gear 60 located around its inner diameter. Ring gear 60 is elongated along the axis of drive housing 30 to extend for a distance which is sufficient to compass the height of the stacked gear train 6, i.e. the combined height of all the planetary gear stages 50a–50d when these stages are sequentially stacked on top of one another. The planetary gears 54 in each stage 50 are arranged to engage with internal ring gear 60. Thus, as sun gear 52 in each stage 50 rotates the planetary gears 54, the planetary gears 54 rotate or crawl around ring gear 60. As is well known by those skilled in the art with respect to planetary gear trains, the amount of speed reduction in each stage 50 is generally determined by the difference in the number of teeth on the sun gear 52 for that stage and the number of teeth in the internal ring gear 60.

The improvement of this invention comprises means for causing the planetary gears 54 in each gear stage 50 to self align with the internal ring gear 60 in an automatic fashion and without intervention by the assembler as each gear stage 50 enters through the open lower end of drive housing 30 during assembly and approaches the beginning of ring gear 60. This self aligning means comprises a stepped forward extension 70 of ring gear 60 provided only over a portion of the circumference of ring gear 60 at the forward edge 62 of ring gear 60. Edge 62 is denoted as the forward edge since it is the edge of ring gear 60 that is contacted by stages 50 when drive housing 30 is inverted with the open lower end facing upwardly and the stages 50 are dropped down into drive housing 30. The inverted orientation of drive housing 30 with the open lower end facing upwardly, prior to that end being closed by end cap 40, is shown in FIG. 5.

Figure 5:
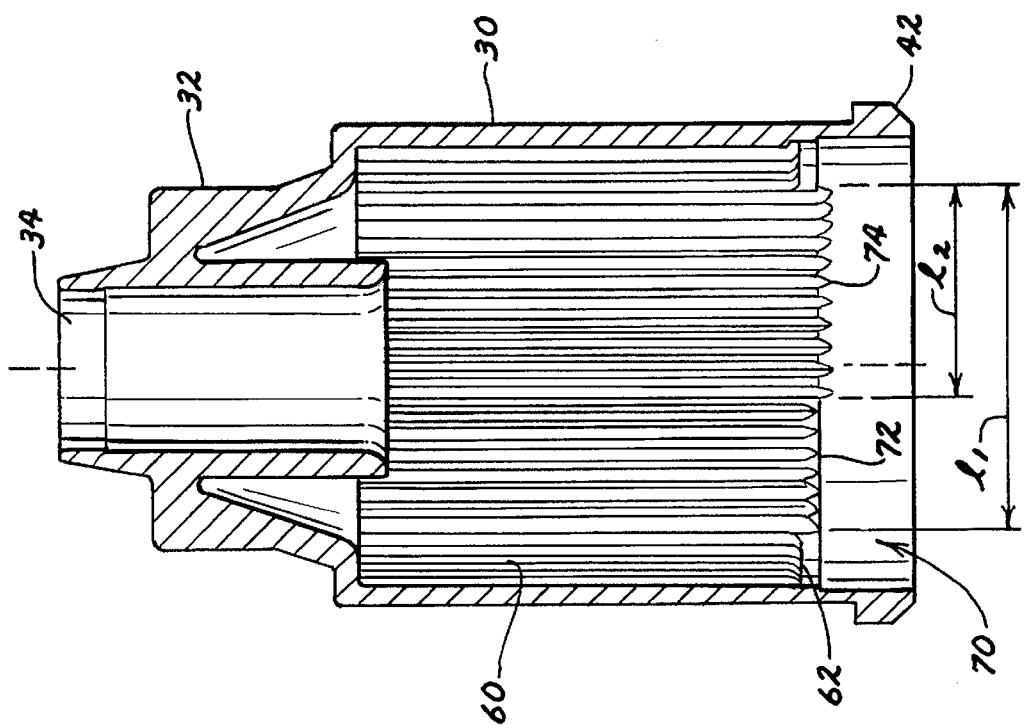
FIG. 5 is a cross-sectional view of the drive housing portion of the drive assembly shown in FIG. 2, illustrating the internal ring gear therein and specifically the means for causing the planetary gears in each planetary gear stage to self align with the internal ring gear as each planetary gear stage drops down into the drive housing.

As shown in FIG. 5, stepped extension 70 preferably comprises a first stepped portion 72 that extends forwardly from forward edge 62 of ring gear 60, and a second stepped portion 74 that extends further above the first stepped portion 72 but for a shorter circumferential distance than first stepped portion 72. The circumferential length of first stepped portion 72, indicated as $l_1$ in FIG. 5, is long enough so that at least one planetary gear 54 in each three gear stage 50a–50c engages with stepped portion 72. The circumferential length of second stepped portion 74, indicated as $l_2$ in FIG. 5, is long enough so that at least one planetary gear 54 in the last four gear stage 50d engages with stepped portion 74. Without second stepped portion 74, first stepped portion 72 is long enough so that it would be possible for two of the planetary gears 54d in the last gear stage 50d to simultaneously engage the stepped portion 72, which is undesirable. Second stepped portion 74 is shorter and extends above first stepped portion 72 to ensure that only one planetary gear 54d in even the four gear stage 50d becomes engaged with a stepped portion before the other gears in the gear stage 50d hit any portion of the internal ring gear 60

The stepped, forward extension 70 on ring gear 60 engages only one of the planetary gears 54 in each stage 50 as each stage 50 approaches the forward edge 62 of ring gear 60 during assembly. This engagement occurs before any of the other planetary gears 54 comes into contact with ring gear 60. The engagement of the one planetary gear 54 with stepped extension 70, i.e. either with stepped portion 72 or stepped portion 74, will cause this gear 54 to rotate slightly, if need be, until it is precisely aligned with the splines in internal ring gear 60. Such rotation of this one gear 54 will be transmitted through sun gear 52 to the other planetary gears 54 in that stage 50 so that all the other planetary gears 54 also become properly aligned with ring gear 60 before they reach ring gear 60. Thus, when the other planetary gears reach ring gear 60, they are positioned so that each planetary gear engages in just the right groove of ring gear 60 to ensure that stage 50 is inserted into ring gear 60 without any binding of the planetary gears 54.

Without the use of stepped extension 70, all the gears 54 reach the forward edge 62 of ring gear 60 at the same time and simultaneously enter into the grooves of ring gear 60. It is necessary that planetary gears 54 engage ring gear 60 in those grooves of ring gear 60 that cause the points of engagement to be equally spaced from one another, i.e. at 120° when there are three gears 54 in each stage or at 90° when there are four gears 54 in each stage. However, without use of stepped extension 70, when gears 54 simultaneously engage ring gear 60, some of the gears 54 will sometimes engage one groove on either side of the groove that should have been engaged. This is the problem solved by this invention. The mere act of dropping each gear stage 50 down into drive housing 30 automatically properly aligns the planetary gears 54 in that stage with the ring gear 60.

When assembling gear train 6 inside drive housing 30, the drive housing is inverted and the gear stages are dropped down into drive housing 30 in reverse order, i.e. the last stage 50d is dropped down into drive housing 30 first, then stage 50c, then stage 50b, and finally stage 50a. In so assembling such stages, a guide pin or spindle can be extended up along the axis of drive housing having a free upper end located somewhat above the forward edge 62 of ring gear 60. All of the sun gears 52 and gear carriers 56 have a central bore for receiving such spindle thus allowing each stage to be dropped down on this guide spindle into drive housing 30. After all the stages 50 are so assembled in drive housing 30, cap 40 can be pressed onto the open end of drive housing 30.

Various modifications of this invention will be apparent to those skilled in the art. For example, while drive assembly 4 has been illustrated for use with a rotary sprinkler, the principles of this invention can be applied to any planetary gear drive assembly used for rotating any object. In addition, the gear train 6 could have fewer or more than four stages 50 if so desired. This invention is simply useful for automatically aligning the planetary gears in planetary gear stages with an internal ring gear on the drive housing in which the planetary gear train is enclosed.

In addition, stepped extension 70 is desirably made as part of drive housing 30 as an integral portion of ring gear 60 such that ring gear 60 with stepped extension 70 can be integrally molded in a single step. However, it would be possible to use a separate extension 70 having a tooth configuration identical to ring gear 60 during the assembly process of gear train 6 with ring gear 60 in this case having a straight forward edge 62. Such a separate extension would simply be inserted into drive housing 30 during the assembly process to abut up against the forward edge 62 of ring gear 60 with this separate extension having its teeth and grooves aligned with the teeth and grooves of ring gear 60. For example, the separate extension could be part of an assembly fixture in which drive housing 30 is held while gear train 6 is assembled therein, with the separate extension dropping down into and aligning with the teeth of ring gear 60 when drive housing 30 is placed in such fixture.

Such a separate extension, shaped much like the integral extension 70 that is preferably formed as part of ring gear 60, would then be in place during the assembly process to perform the same gear alignment function described above. At the conclusion of the assembly process, this separate extension would slip out of the drive housing having served its purpose during assembly of gear train 6. Use of a separate extension is not preferred over an integral extension 70 since the teeth in a separate extension would have to be aligned to the teeth in ring gear 60 each time the extension is put in place in or adjacent an empty drive housing 30 waiting to receive the gear train. An integral extension 70 is always in place and is always aligned as it is made as part of ring gear 60 when drive housing 30 is molded. Nonetheless, use of a separate extension in the manner noted is intended to be part of this invention and to be covered by the claims hereof.

Accordingly, this invention is to be limited only by the appended claims.

We claim:

1. A planetary gear drive assembly, which comprises:
   (a) a drive housing having an internal ring gear on an inner diameter of the drive housing;
   (b) a planetary gear train within the drive housing, wherein the planetary gear train includes at least one planetary gear stage comprising:
      (i) a central sun gear; and
      (ii) a plurality of planetary gears spaced around and in engagement with an outer diameter of the sun gear such that rotation of the sun gear rotates the planetary gears, each planetary gear further being in engagement with the internal ring gear on the drive housing; and
   (c) means for causing the planetary gears in each planetary gear stage to self align with the internal ring gear in an automatic fashion and without manual intervention responsive to the movement of each planetary gear stage towards the ring gear during assembly of each planetary gear stage within the drive housing.

2. The planetary gear drive assembly of claim 1, wherein the planetary gear train includes a plurality of planetary gear stages.

3. The planetary gear drive assembly of claim 1, wherein the self aligning means comprises a stepped extension extending in advance of a forward edge of the ring gear with the stepped extension further extending around only a portion of a circumference of the ring gear.

4. The planetary gear drive assembly of claim 3, wherein the stepped extension comprises first and second stepped portions.

5. The planetary gear drive assembly of claim 4, wherein each stepped portion has a height measured by how far forwardly the stepped portion extends from a forward edge of the ring gear and a circumferential length measured by how far the stepped portion extends around the ring gear's circumference, and wherein the first stepped portion has a different height and circumferential length compared to the height and circumferential length of the second stepped portion.

6. The planetary gear drive assembly of claim 5, wherein the first stepped portion has a smaller height than the height of the second stepped portion but a longer circumferential length than the circumferential length of the second stepped portion.

7. The planetary gear drive assembly of claim 6, wherein the second stepped portion circumferentially over-lies the first stepped portion.

8. The planetary gear drive assembly of claim 6, wherein the first and second stepped portions are integral continuations of the ring gear.

9. The planetary gear drive assembly of claim 1, wherein the self aligning means is integrally formed on the drive housing.

10. The planetary gear drive assembly of claim 1, wherein the self aligning means is an integral continuation of the ring gear.

11. A method of assembling a planetary gear drive assembly of the type having a drive housing that includes an internal ring gear located on an inner diameter of the drive housing, a planetary gear train located within the drive housing, wherein the planetary gear train includes at least one planetary gear stage comprising a central sun gear and a plurality of planetary gears spaced around and in engagement with an outer diameter of the sun gear such that rotation of the sun gear rotates the planetary gears, each planetary gear further being in engagement with the internal ring gear on the drive housing when assembled, which includes the steps of:
   (a) providing alignment means extending in advance of the ring gear from a forward edge thereof, wherein the alignment means forms a continuation of the ring gear only over a circumferential portion of the ring gear such that the alignment means will first contact only one of the planetary gears in the gear stage before any of the other planetary gears in the gear stage encounter the ring gear; and
   (b) inserting at least one gear stage down into the housing such that the one of the planetary gears in the gear stage engages the alignment means before the other planetary gears of the gear stage engage the forward edge of the ring gear to self align all the planetary gears with the ring gear and ensure proper assembly.

12. A planetary gear drive assembly, which comprises:
   (a) a drive housing having an internal ring gear on an inner diameter of the drive housing;
   (b) a planetary gear train within the drive housing, wherein the planetary gear train includes at least one planetary gear stage comprising:
      (i) a central sun gear; and
      (ii) a plurality of planetary gears spaced around and in engagement with an outer diameter of the sun gear such that rotation of the sun gear rotates the planetary gears, each planetary gear further being in engagement with the internal ring gear on the drive housing; and
   (c) a stepped extension extending in advance of a forward edge of the ring gear with the stepped extension further extending around only a portion of a circumference of the ring gear to self align each planetary gear stage with the internal ring gear as each planetary gear stage moves towards the ring gear during assembly of each planetary gear stage within the drive housing.

13. The planetary gear drive assembly of claim 12, wherein the planetary gear train includes a plurality of planetary gear stages with some gear stages having different numbers of planetary gears than other gear stages, and wherein the stepped extension has different stepped portions to self align all the planetary gear stages regardless of the number of planetary gears in the gear stages.

14. The planetary gear drive assembly of claim 13, wherein the stepped extension is an integral continuation of the ring gear.

* * * * *